United States Patent
Ecktman

[19]

[11] Patent Number: 6,070,861
[45] Date of Patent: Jun. 6, 2000

[54] BUMPER EXTENSION FOR USE WITH A BUMPER ON AN AIR SPRING

[75] Inventor: Jack D. Ecktman, Indianapolis, Ind.

[73] Assignee: Bridgestone/Firestone, Inc, Akron, Ohio

[21] Appl. No.: 09/041,613

[22] Filed: Mar. 12, 1998

(Under 37 CFR 1.47)

[51] Int. Cl.$^7$ ............................................. F16M 1/00
[52] U.S. Cl. ................................. 267/140; 267/64.27
[58] Field of Search .............................. 267/64.21, 64.23, 267/64.24, 64.27, 122, 140, 152, 153; 280/124.158–124.161; 248/615, 632, 634, 636; 293/110, 122, 136

[56] References Cited

U.S. PATENT DOCUMENTS

| | | | |
|---|---|---|---|
| 3,203,723 | 8/1965 | Montenare | 293/110 |
| 3,323,763 | 6/1967 | Butts | 267/153 |
| 3,831,923 | 8/1974 | Meldrum | 267/153 |
| 3,933,387 | 1/1976 | Salloum et al. | 293/71 R |
| 4,025,063 | 5/1977 | Willison | 267/153 |
| 4,506,910 | 3/1985 | Bierens | 280/711 |
| 4,639,159 | 1/1987 | Amrath | 403/50 |
| 4,674,911 | 6/1987 | Gertz | 293/110 |
| 4,688,776 | 8/1987 | Lecour et al. | 267/140.1 |
| 4,781,365 | 11/1988 | Harrison | 267/153 |
| 4,787,606 | 11/1988 | Geno et al. | 267/64.27 |
| 4,852,861 | 8/1989 | Harris | 267/64.27 |
| 4,925,224 | 5/1990 | Smiszek | 293/120 |
| 5,201,500 | 4/1993 | Ecktman et al. | 267/140 |
| 5,382,006 | 1/1995 | Arnold | 267/64.27 |

*Primary Examiner*—Chris Schwartz
*Attorney, Agent, or Firm*—John M. Vasuta; Michael Sand

[57] ABSTRACT

An air spring has a pair of spaced end members for mounting the spring at spaced locations on a structure. A flexible sleeve of elastomeric material is sealingly engaged with the end members and forms a pressurized fluid chamber therebetween. A post is mounted on one of the end members and extends into the fluid chamber. A shock absorbing bumper formed of a high strength plastic is snap-fitted on an enlarged top of the post. One or more bumper extensions are stackable and matable on top of the bumper so as to allow for height adjustment without bumper removal.

19 Claims, 4 Drawing Sheets

FIG-6
PRIOR ART
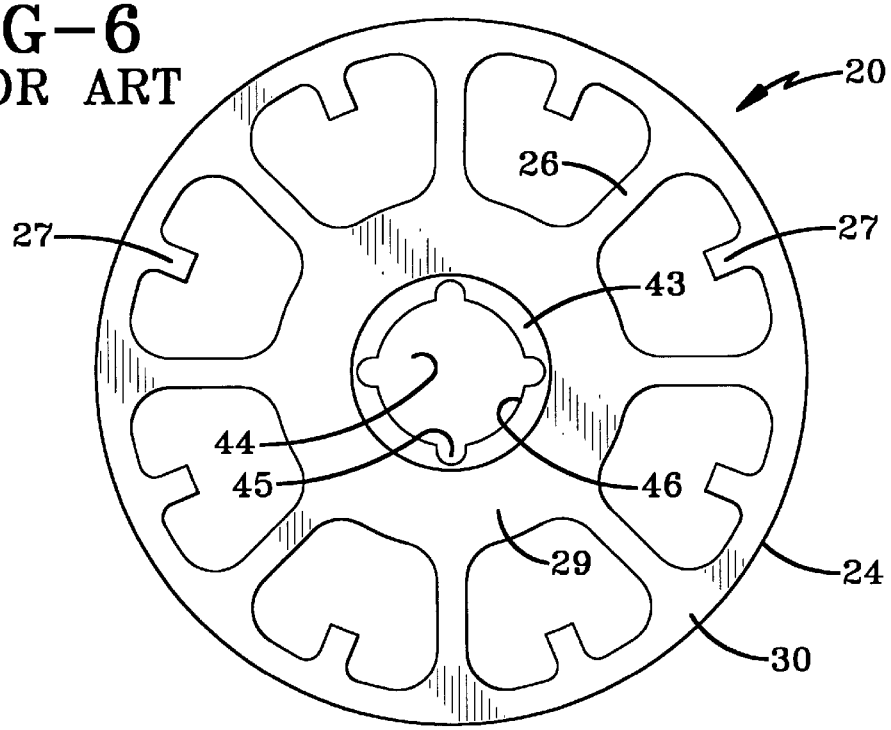
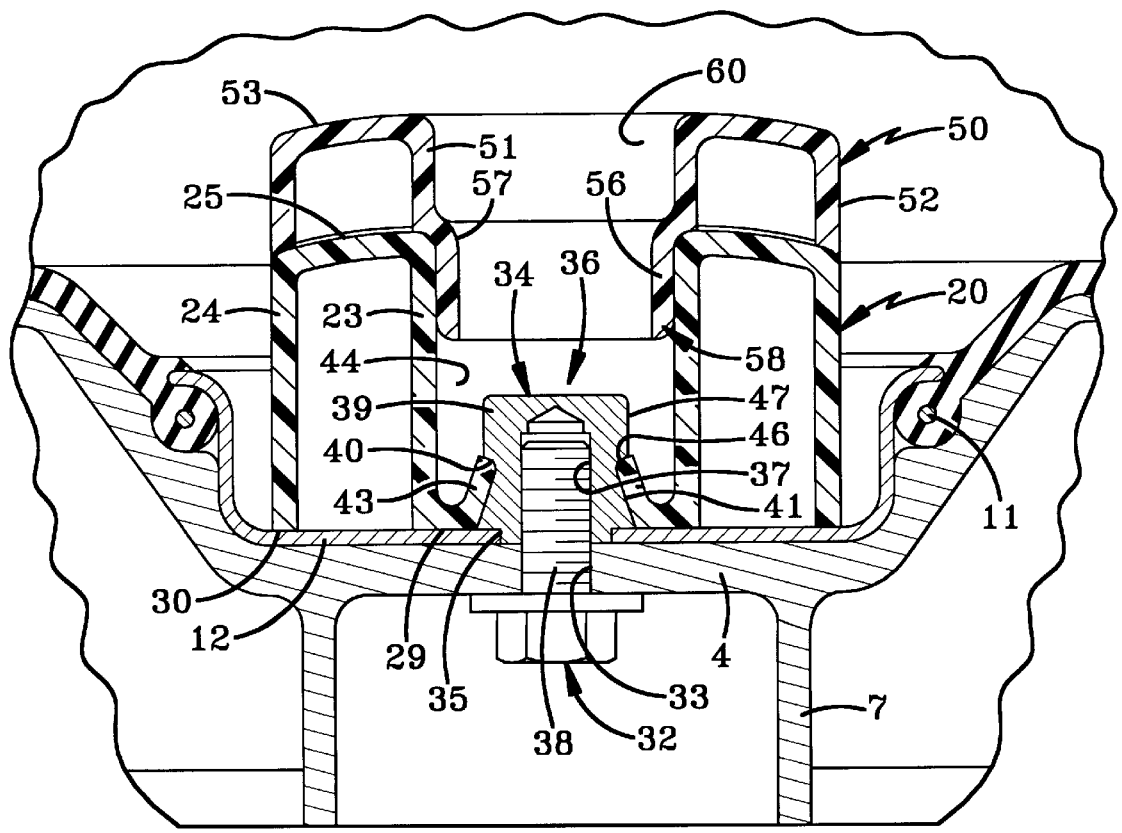
FIG-8

BUMPER EXTENSION FOR USE WITH A BUMPER ON AN AIR SPRING

BACKGROUND OF THE INVENTION

1. Technical Field

The invention relates to air springs and, in particular, to air springs having an internal bumper which acts as a back-up in case of air spring failure or to absorb sudden large deflections or shocks imparted on the air springs. More particularly, the invention relates to a bumper extension for use on an air spring having an already-existing bumper utilized in the air spring, where the bumper extensions are positioned over the existing bumper in either a single or a stacked configuration so as to allow the adjustment of the stop height of an air spring without requiring the replacement of the existing bumper.

2. Background Information

Pneumatic springs, commonly referred to as air springs, have been used for motor vehicles and various machines and other equipment for a number of years to provide cushioning between movable parts, primarily, to absorb shock loads imparted thereon. The air spring usually consists of a flexible rubber sleeve which extends between a pair of end members which contain a supply of compressed air and may have one or more pistons located within the flexible sleeve. The end members mount the air spring on spaced components or parts of the vehicle or equipment on which the air spring is mounted.

The internal pressurized fluid, which is generally air, absorbs most of the shock impressed upon or experienced by one of the spaced end members by which the air spring is mounted, with the ends members moving axially toward and away from each other upon absorbing the imparted shock. Examples of such air springs are well known in the art and include U.S. Pat. Nos. 4,787,606, 4,852,861, 4,946,144 and 5,201,500.

Certain of these prior art springs have internal bumpers mounted on one of the end members which extends into the interior of the pressurized chamber. The bumper prevents total collapse or deflection of the spring member in the event of air spring failure. The bumper also absorbs shock upon the spring experiencing severe shocks and deflections which result in actual or near "bottoming out" of the spring member. Heretofore, these bumpers consisted of an elastomeric member which was mounted on a stud extending outwardly from one of the end members, such as is shown in U.S. Pat. Nos. 4,787,606 and 5,201,500. Although these elastomeric bumpers are satisfactory for most applications, it is found that several disadvantages or inconveniences result from their use, including the requirement of lubrication, special equipment to assemble the bumpers on the projecting studs, and the inability to alter the height of the bumper without complete removal and replacement thereof.

Therefore, the need exists for an improved type of air spring bumper which eliminates the heretofore-used elastomeric bumpers, thereby overcoming any disadvantages of their use.

Examples of other prior art inventions including shock-absorbing components are set forth in the following summaries.

U.S. Pat. No. 3,658,314 discloses a fluid shock absorber having an elastomeric member mounted between two concentrically movable tubes with an elastomeric bumper mounted beneath the inner tube to absorb impact from the tube.

U.S. Pat. No. 4,218,599 discloses a polymer spring for use in a drawer of a cabinet to ensure that when the drawer is closed, it does not rebound to a partially open position.

U.S. Pat. No. 4,342,264 shows another type of air spring using an elastomeric bumper mounted on one of the end members.

U.S. Pat. No. 4,478,396 discloses an elastomeric bumper which is mounted on the top of a vehicle strut.

U.S. Pat. No. 4,506,910 discloses a bumper 60 mounted on the inner surface of mounting plate 53 of the air spring, whereby the bumper provides a limit to any extreme swinging of the beam attached to the piston opposed to the mounting plate.

U.S. Pat. No. 4,787,606 shows a rubber bumper attached to the inner surface of one of the end plates by a pin where the rubber bumper serves to prevent total collapse or deflection of the spring assembly.

U.S. Pat. No. 4,925,224 discloses an energy-absorbing bumper with an elastomeric bumper module. The energy-absorbing bumper is attachable to a vehicle where it serves to absorb the energy of an impact of that vehicle with another object.

U.S. Pat. No. 5,201,500 shows an air spring in which a post is mounted on one of the end members and extends into the fluid chamber where a shock-absorbing bumper is formed and snap-fitted on the enlarged top of the post.

However, no known prior art, including those discussed above, disclose an air spring having an internal bumper that receives bumper extensions to provide height adjustability of the bumper.

SUMMARY OF THE INVENTION

An objective of the invention includes providing an improved air spring construction for motor vehicles and other types of equipment having spaced movable end members separated by a pressurized chamber extending between the end members for absorbing excessive shock imparted on the end members.

A further objective of the invention is to provide such an improved air spring in which a plastic bumper is mounted within the pressurized chamber.

A further objective of the invention is to provide such an improved air spring in which the shock-absorbing bumper is formed of a high-strength plastic material to absorb sudden large deflections and to act as a back-up device in case of air spring failure.

A further objective of the invention is to provide such an improved air spring in which the height of the shock-absorbing bumper may be adjusted without removal of the shock-absorbing bumper.

A further objective of the invention is to provide such an improved air spring in which the shock-absorbing bumper may selectively receive bumper extensions so as to selectively adjust the height of the bumper without removal of said bumper mounted within the pressurized chamber.

A further objective of the invention is to provide such an improved air spring which allows for interchangeable extension of the existing bumper.

A further objective of the invention is to provide such an improved air spring which provides for bumper stop height flexibility.

A further objective of the invention is to provide such an improved air spring which provides sufficient vertical load capability.

A further objective of the invention is to provide such an improved air spring which provides sufficient lateral load capability.

A further objective of the invention is to provide such an improved air spring which provides sufficient life in terms of cycles.

A further objective of the invention is to provide such an improved air spring which is lighter in weight, easier and less expensive to assemble, which can carry greater loads at equivalent deflections than the heretofore-used elastomeric bumpers, and which has overall bumper height flexibility.

These objectives and advantages are obtained by the improved air spring construction of the invention, the general nature of which may be stated as being an air spring of the type having a pair of spaced end members adapted to be mounted at spaced locations and a flexible sleeve formed of an elastomeric material sealingly engaged with the end members and forming a pressurized fluid chamber therebetween, said improved air spring further including a shock-absorbing bumper mounted within the pressurized fluid chamber on one of the spaced end members for possible impact engagement with the other of said end members, said improvement including a bumper extension stackable on the bumper to add height to the shock-absorbing bumper.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIG. 6 is a bottom plan view of a prior art snap-on bumper of the type which may be used with the bumper extension of the present invention;

FIG. 8 is an enlarged fragmentary sectional view of the lower portion of FIG. 7.

Similar numerals refer to similar parts throughout the drawings.

DESCRIPTION OF THE PREFERRED EMBODIMENT

Figure 1:
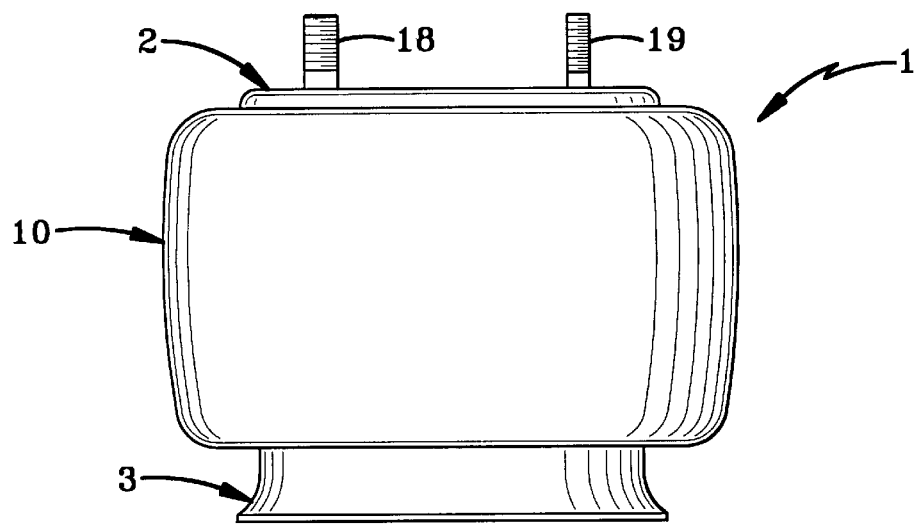
FIG. 1 is a perspective view of an air spring of the type in which the improved bumper extensions are utilized.
Figure 7:
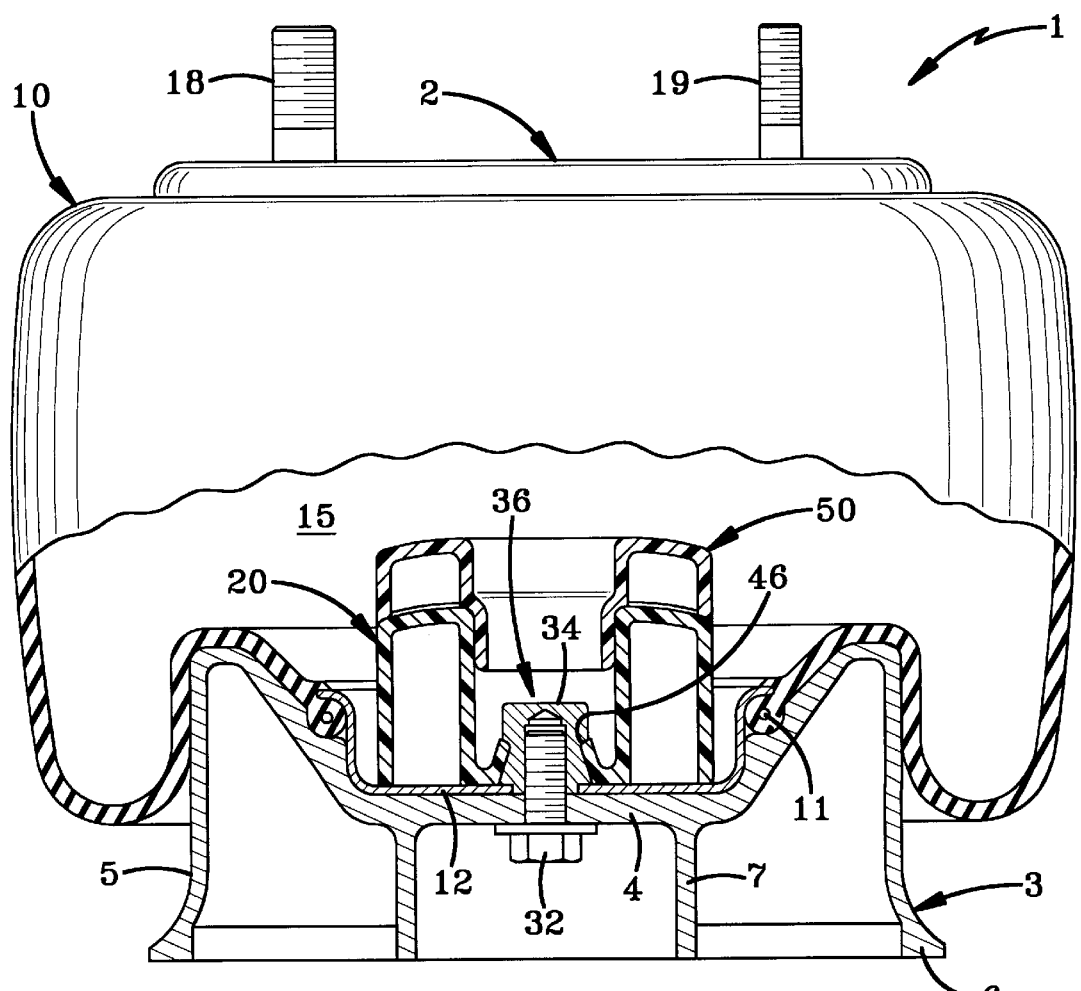
FIG. 7 is an enlarged perspective view, a portion of which is taken in section, of the improved air spring with a snap-on bumper and one bumper extension attached thereto.
Figure 2:
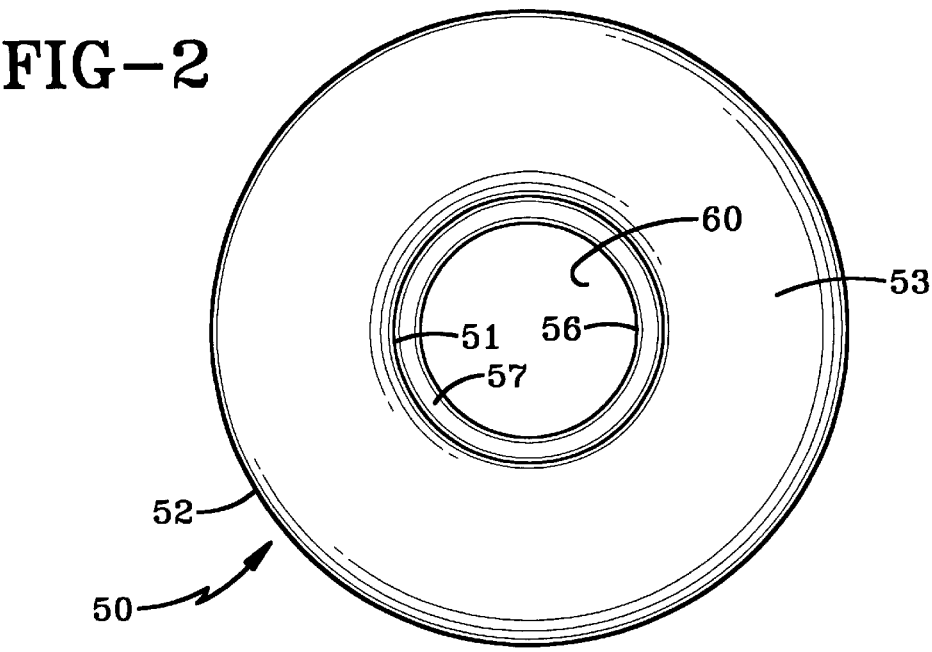
FIG. 2 is a top plan view of the bumper extension of FIG. 1.

The improved air spring of the invention is indicated generally at 1, and is shown in an unmounted, at-rest position in FIGS. 1 and 7. Air spring 1 includes an upper end cap member and an opposed axially spaced piston member, indicated generally at 2 and 3, respectively (FIGS. 1 and 7). Piston 3 is of a usual construction, preferably having an inverted generally bowl-shaped configuration formed of a suitable material such as aluminum, steel, high strength plastic or the like. Piston 3 includes a base 4 and an annular wall 5 extending downwardly from the base, terminating in a peripheral edge 6. A central supporting structure 7 is joined with and extends downwardly from base 4.

One end of a flexible sleeve which is indicated generally at 10, terminates in a lower bead 11 which is clamped on base 4 of piston 3 by a clamping plate 12 in an air tight sealing relationship with piston 3. The other end of sleeve 10 has an end bead 13 which is secured in a curled marginal edge 14 of mounting end cap 2 in an airtight sealing relationship therewith, providing a fluid tight chamber 15 within elastomeric sleeve 10. Other types of end sealing arrangements may be utilized without effecting the concept of the invention, such as shown in U.S. Pat. Nos. 4,852,861, 4,787,606 and 4,946,144, which are assigned to the same entity as is the present invention, which do not require a beaded end seal.

A source of pressurized air or other fluid, communicates with chamber 15 through a hollow bore 17 of a mounting stud 18 extending outwardly from end plate 2. One or more additional mounting studs 19 are mounted on end cap 2 and extend upwardly therefrom for mounting air spring 1 on a vehicle, machine tool or other application in which it is to be used.

The particular air spring construction described above and shown in the drawings and particularly in FIGS. 1 and 7, may vary without affecting the concept of the invention.

A snap-on bumper, indicated generally at 20 (FIG. 6), is mounted on base 4 of piston 3 and extends upwardly therefrom into chamber 15. This bumper is described and shown in detail in U.S. Pat. No. 5,201,500, which is hereby incorporated by reference. Bumper 20 engages end cap 2 in the event of a failure of the pressurized fluid within air chamber 15, or assists in absorbing excessive shock forces exerted on either of the end members.

Bumper 20 includes inner and outer generally cylindrical walls 23 and 24, respectively, concentrically arranged with each other which terminate in an integral dome-shaped connecting top wall 25. A plurality of radially extending reinforcing ribs 26 are formed integrally with inner and outer walls 23 and 24 and extend therebetween to provide a rigid integrally formed one-piece bumper member. A second plurality of reinforcing ribs 27 are located between adjacent pairs of reinforcing ribs 26, and extend radially inwardly toward inner wall 23 from outer wall 24 only a short distance to provide increased strength for outer wall 24. Inner wall 23 terminates in an annular base 29 which lies in the same plane as does the annular peripheral edge 30 of outer wall 24 as shown particularly in FIG. 6.

Plate 12 is secured in a fluid tight clamping relationship with sleeve bead 11 by a threaded clamping stud 32 which extends through an opening 33 formed in base 4 in cooperation with an end cap, indicated generally at 34. Cap 34 preferably is formed of a mild steel and is secured to clamp plate 12 by brazing at 35. The interior of end cap 34 has a threaded bore 37 for threaded connection with threaded shaft 38 of clamping stud 32, and together form a central bumper attachment post 36. Other types of attachment posts 36 may be utilized than that shown in the drawings, without effecting the concept of the invention. For example, post 36 could be molded of a high strength plastic integral with a plastic piston member 3, or could be welded or brazed to an inside surface of a metal piston member. Both of these constructions would eliminate an opening being required through the base of the piston.

End cap 34 is formed with an enlarged outer end 39 which forms an annular undercut 40 adjacent the outwardly tapering annular side wall 41 of post 36. Bumper 20 is formed with a plurality of flexible angled fingers 43 (FIGS. 6 and 8) which extend upwardly inwardly into a hollow interior 44 formed by inner wall 23.

In one embodiment, there are four flexible fingers 43 spaced circumferentially apart by intervening areas 45, with each finger terminating in an outer arcuate edge 46 which snaps into and seats in undercut 40. Arcuate edges preferably have arcuate lengths or angles of approximately 75 degrees each, and are inclined inwardly and form an included angle of approximately 20 degrees with inner wall 23. In another embodiment, only one finger 43 exists where such finger is annular.

Post 36 forms a vertically extending member located within the interior 44 of bumper 20 with flexible fingers 43 enabling bumper 20 to be snap-fitted on end cap 34 of the mounting post as shown in FIG. 8, by flexing outwardly as it is being forced downwardly on the mounting post. Immediately upon edges 46 of finger 43 moving beyond cylindrical side wall portion 47 of enlarged post end 39, the flexibility of the fingers will enable them to snap into position in undercut 40. When bumper 20 is in position on post 36, annular base 29 will seat upon clamp plate 12, firmly mounting bumper 20 in position within pressure chamber 15. Thus, fingers 43 are secured between undercut 40 and clamp plate 12 and the flexibility of fingers 43 retain the arcuate edges thereof, in undercut 40, with the slope surfaces of the fingers lying along tapered side wall 41 of end cap 34.

Figure 9:
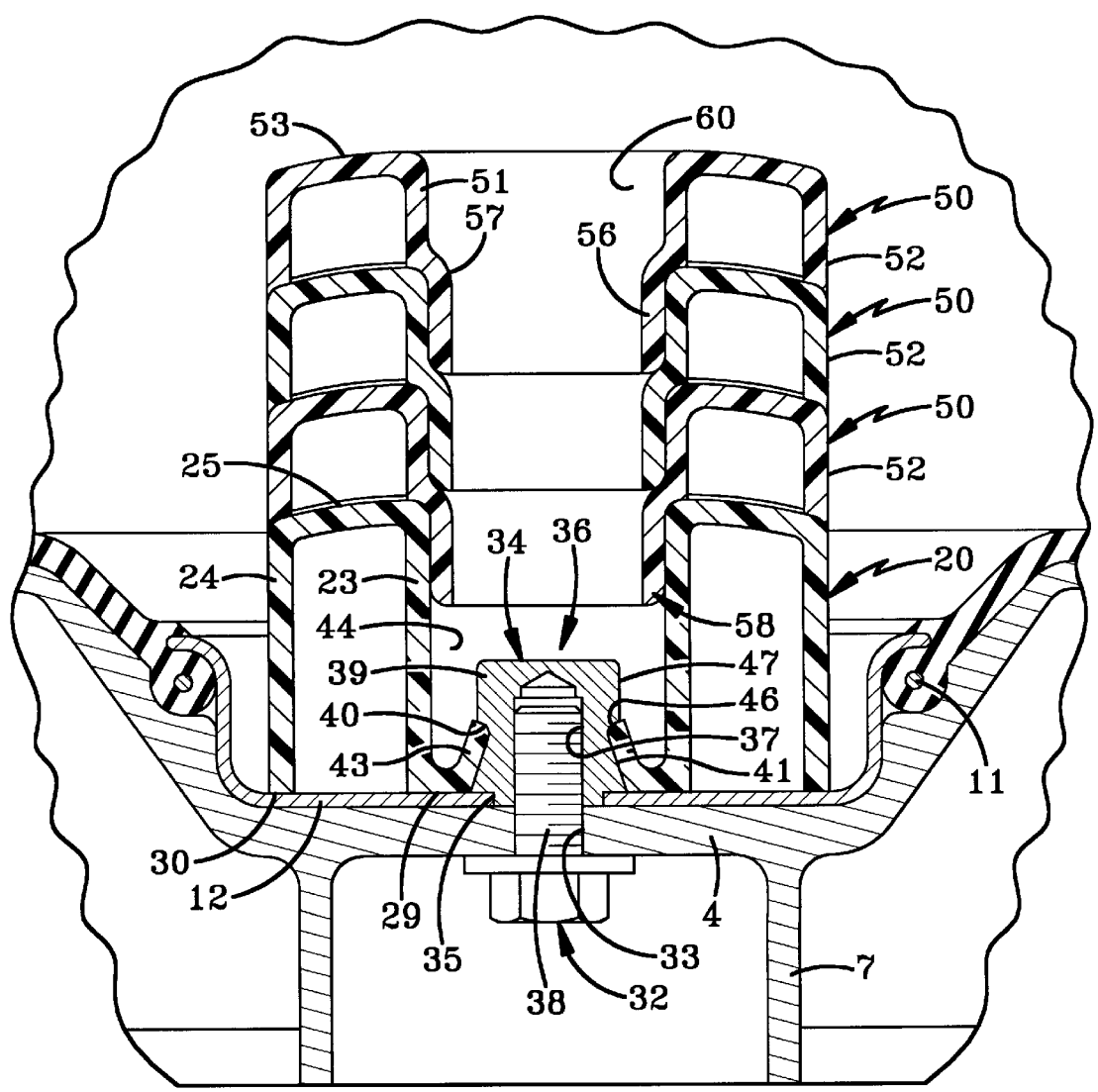
FIG. 9 is an enlarged fragmentary sectional view similar to FIG. 8 showing multiple bumper extensions affixed on a snap-on bumper of the improved air spring.

In accordance with the invention, one or more bumper extensions 50 may be selectively mounted on snap-on bumper 20, as is shown in FIGS. 7–9. Bumper extensions 50 allow the use of existing bumpers 20 while serving to provide different stop heights without making and installing a new or replacement bumper.

Figure 4:
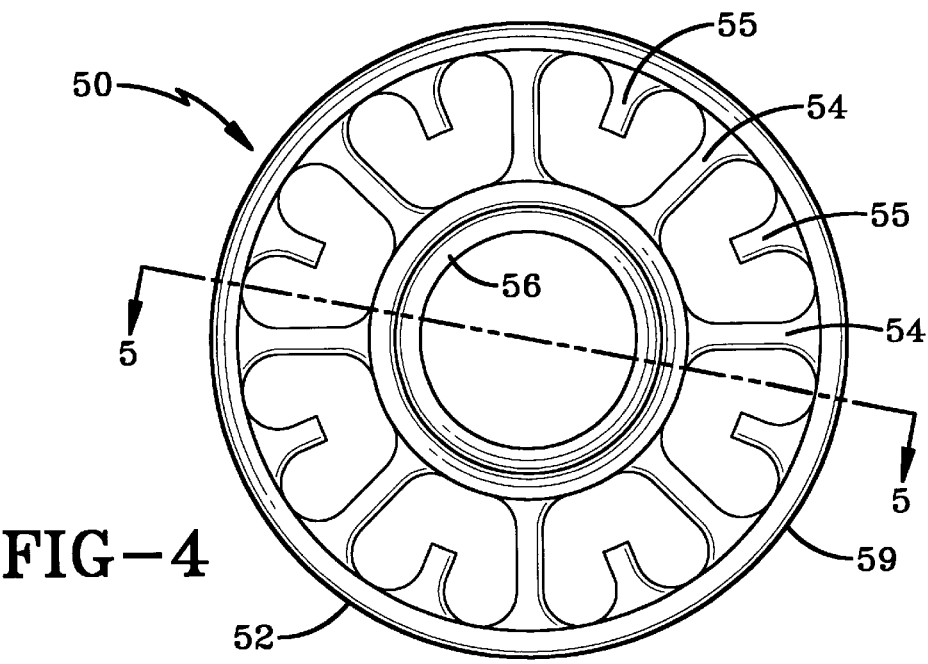
FIG. 4 is a bottom plan view of the bumper extension of FIG. 1.
Figure 5:
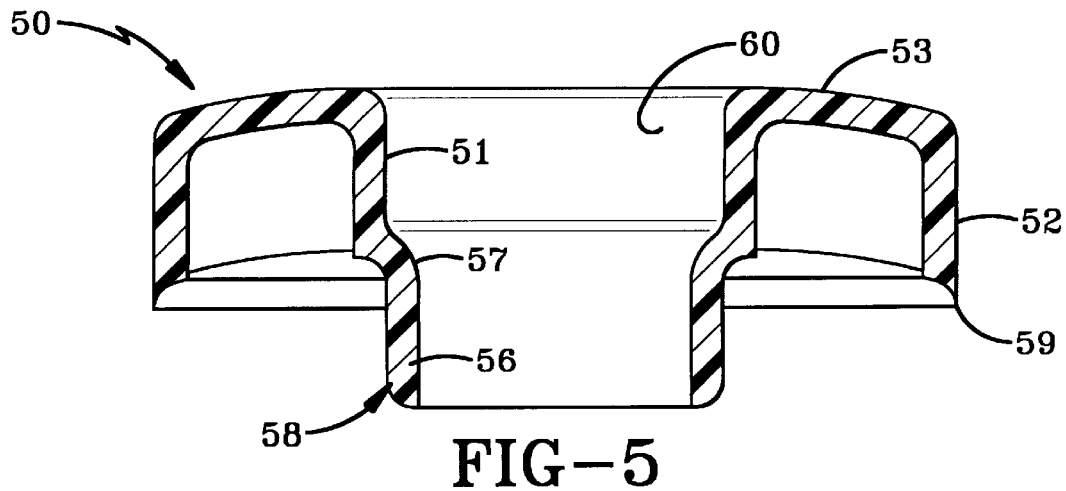
FIG. 5 is a sectional view of the bumper extension as shown in FIG. 1 taken along line 5—5, FIG. 4.

Each bumper extension 50 includes inner and outer generally cylindrical walls 51 and 52, respectively, concentrically arranged with each other which terminate in an integral dome-shaped connecting top wall 53. A plurality of radially extending reinforcing ribs 54 (FIG. 4) are formed integrally with inner and outer walls 51 and 52 and extend therebetween to provide a rigid integrally formed one-piece bumper member. A second plurality of reinforcing ribs 55 are located between adjacent pairs of reinforcing ribs 54 and extend radially inwardly toward inner wall 51 only a short distance to provide increased strength for outer wall 52.

Figure 3:
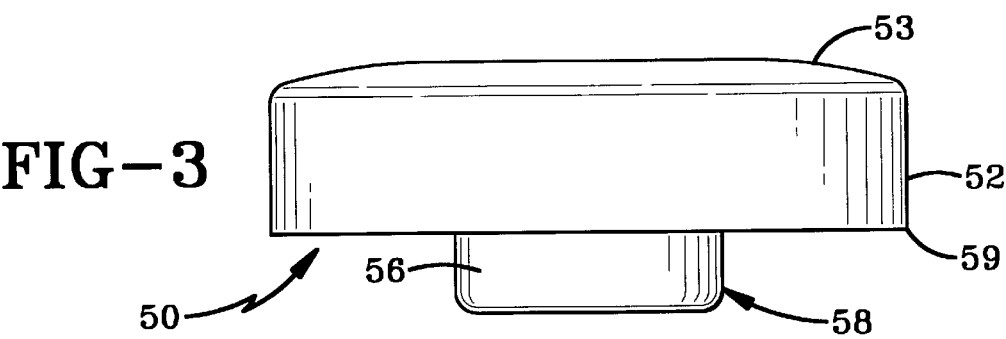
FIG. 3 is a side elevational view of the bumper extension of FIG. 1.

Inner wall 51 terminates in an alignment cylinder 58 (FIG. 3) having an offset extension 56 which includes an inwardly angled annular cylinder 57 (FIG. 8). Alignment cylinder 58 extends downward in an offset manner from inner wall 51 further than the annular peripheral edge 59 of outer wall 52. Alignment cylinder 58 also is of a smaller diameter than the annular area (interior 60) created by inner wall 51, where the outer diameter of the alignment cylinder 58 is substantially equivalent to the inner diameter of the annular area (interior 60) created by inner wall 51 such that the alignment cylinder snugly seats within interior 44 of bumper 20, as shown in FIG. 8, or within interior 60 of an adjacent bumper extension 50, as shown in FIG. 9.

After one or more bumper extensions 50 has been snugly seated within interior 44 of bumper 20, as shown in FIG. 8, or within interior 60 of an adjacent bumper extension 50, as shown in FIG. 9, the extension is either temporarily or permanently connected thereto. Specifically, a sonic or spin-weld or glue could be used to permanently affix the stacked bumper extensions 50 to each other and to bumper 20. The result would be an increase in the bump-stop height of the air spring. The lower extended part or alignment cylinder 58 provides for perfect alignment as well as lateral support and a larger area for attachment, using such attachment methods as spin welding, sonic welding, or adhesive attachment via glue. As is clearly shown in FIGS. 8 and 9, only one bumper extension 50 may be mated with bumper 20, or multiple bumper extensions 50 may be mated with each other and then mated with bumper 20.

Bumper 20 and bumper extensions 50 are formed of a high strength polyester elastomer or plastic such as sold under the trademark HYTREL, by Du Pont de Nemours Company of Wilmington, Del. The type of HYTREL found most suitable is Dupont's grade 8238 which has a hardness Durometer D of 82, a tensile strength at break of 6800 psi and an elongation at break of 350%. Each of the bumpers 20 and bumper extensions 50 is preferably injection molded out of the same material. Bumper 20 and associated bumper extensions 50 also may be configured square, cloverleaf etc., and need not be cylindrical as described above and shown in the drawings, without effecting the concept of the invention.

Thus, the improved air spring of the invention, and in particular snap-on bumper 20 and bumper extensions 50 thereof, enables the bumper to be installed easily on center post 36 by snap-fitting the bumper in a vertical downward direction over enlarged end 39 of the post, with flexible fingers 43 snapping into position into undercut 40 formed beneath enlarged end 39. This provides a bumper and resulting air spring, which is lighter in weight than prior art bumpers formed of an elastomeric material and, most importantly, enables the bumper to be snap-fitted into position without requiring lubricant and extra equipment heretofore required for installing the elastomeric bumper. Also, the high strength plastic of bumper 20 enables it to absorb greater load shocks at equivalent deflections than that absorbed by the prior elastomeric bumpers.

Bumper extensions 50 provide for interchangeable extension of the existing bumper, bump-stop height flexibility, sufficient vertical load capability, sufficient lateral load capability, and sufficient life in terms of cycles. Basically, this invention allows the use of existing bumpers at different bump-stop heights without making a new bumper, removing the old bumper, and installing the new bumper. Currently, most bumpers or bump stops are fixed at one of only a few standard heights, such as 2.25 inches and 3.25 inches tall. This invention allows the attachment of extensions via a sonic or spin weld or adhesive, whereby one or more extensions could then be stacked upon each other and mated within each other to make the bump-stop height taller than these standard heights.

The extensions are made via injection mold, using the same material and same manufacturing process as the original bumper 20. The extensions will be molded with a mating contour which would fit the existing bumper, as well as with a top contour identical to the existing bumper and/or other mating bumpers, so that more extensions could be stacked and mated on top thereof.

Accordingly, the improved bumper extension is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved air spring containing the snap-on bumper and bumper extensions is constructed and used, the characteristics of the construction, and the advantageous, new and useful results obtained; the new and useful structures, devices, elements, arrangements, parts and combinations, are set forth in the appended claims.

I claim:

1. An improved air spring having a pair of spaced end members adapted to be mounted at spaced locations and a flexible sleeve formed of an elastomeric material sealingly engaged with the end members and forming a pressurized fluid chamber therebetween, said improved air spring further including a shock-absorbing bumper mounted within the pressurized fluid chamber on one of the spaced end members for possible impact engagement with the other of said end members, said improvement including a bumper extension stackable on the bumper to add height to the shock absorbing bumper the bumper extension disposed within the pressurized fluid chamber.

2. The improved air spring defined in claim 1 in which said bumper is formed of a one-piece plastic member having a base formed with a central opening defined by a plurality of circumferentially spaced flexible fingers, each of said fingers being inclined inwardly and upwardly toward an enlarged end portion of a post mounted on the same end member as the bumper and extending into the fluid chamber and are snap-fitted over the enlarged end portion of the post and seated in an undercut thereof for mounting said bumper on the post.

3. The air spring defined in claim 2 in which the bumper has a generally cylindrical configuration with concentrically mounted spaced inner and outer walls, and in which a plurality of first reinforcing ribs extend radially between and are connected to said spaced walls, and in which a plurality of second reinforcing ribs are formed on the outer wall and are located between respective pairs of the first reinforcing ribs, and extend radially toward the inner wall.

4. The air spring defined in claim 3 in which the bumper includes an annular end wall which is dome shaped.

5. The improved air spring defined in claim 2 in which the post includes a central shaft mounted on the said one end member and a separate end cap mounted on said shaft which forms the enlarged end portion.

6. The improved air spring defined in claim 1 in which the bumper extension has a generally cylindrical configuration with concentrically mounted spaced inner and outer walls; and in which a plurality of first reinforcing ribs extend radially between and are connected to said spaced walls.

7. The improved air spring defined in claim 6 in which the inner wall defines a central bore.

8. The improved air spring defined in claim 7 in which the outer wall terminated in an annular edge; in which said bumper having a base formed with a central opening and in which said annular edge and base lie in non-common planes.

9. The improved air spring defined in claim 6 which a plurality of second reinforcing ribs are formed on the outer wall and are located between respective pairs of the first reinforcing ribs, and extend radially toward the inner wall.

10. The air spring defined in claim 1 in which a plurality of bumper extensions are matable with one another and with the bumper.

11. The air spring defined in claim 10 in which each bumper extension includes a transition and alignment cylinder, whereby the transition and alignment cylinder along with a termination point of the outer wall are configured so as to mate with and snugly rest on a dome-shaped annular end wall of an adjacent bumper or bumper extension.

12. The air spring defined in claim 1 in which the bumper and bumper extensions have a tensile strength at break of approximately 6800 psi.

13. The air spring defined in claim 1 in which the bumper and bumper extensions have an elongation at break of approximately 350%.

14. The improved air spring defined in claim 1 in which one of the end members is a piston.

15. The improved air spring defined in claim 1 in which the bumper and bumper extension have a Durometer D hardness of approximately 82.

16. An improved air spring having a pair of spaced end members adapted to be mounted at spaced locations and a flexible sleeve formed of an elastomeric material sealingly engaged with the end members and forming a pressurized fluid chamber therebetween, said improved airspring further including a shock-absorbinq bumper mounted within the pressurized fluid chamber on one of the spaced end members for possible engagement with the other of said end members, said improvement including a bumper extension stackable on the bumper to add height to the shock absorbing bumper;

the bumper extension having a generally cylindrical configuration with concentrically mounted spaced inner and outer walls; and in which a plurality of first reinforcing ribs extend radially between and are connected to said spaced walls;

an alignment cylinder being formed integrally with and extends from the inner wall downwardly beyond the termination of the inner wall and where a transition annularly angles inward from the inner wall to the alignment cylinder.

17. The improved air spring defined in claim 16 in which the spaced inner and outer walls terminate in an annular end wall which is dome shaped.

18. An improved air spring having a pair of spaced end members adapted to be mounted at spaced locations and a flexible sleeve formed of an elastomeric material sealingly engaged with the end members and forming a pressurized fluid chamber therebetween, said improved air spring further including a shock-absorbing bumper mounted within the pressurized fluid chamber on one of the spaced end members for possible impact engagement with the other of said end members, said improvement including a bumper extension stackable on the bumper to add height to the shock-absorbing bumper, the bumper extension having a generally cylindrical configuration with concentrically mounted spaced inner and outer walls, and wherein the bumper extension includes an alignment cylinder which is formed integrally with and extends from the inner wall downward beyond the termination of the inner wall and where a transition annularly angles inward from the inner wall to the alignment cylinder.

19. The improved air spring defined in claim 18 in which the spaced inner and outer walls terminate in an annular end wall which is dome shaped.

* * * * *